(12) United States Patent
Allen et al.

(10) Patent No.: US 7,261,229 B1
(45) Date of Patent: Aug. 28, 2007

(54) SWING-AWAY HITCH MOUNTED EQUIPMENT CARRIER

(75) Inventors: Alexander R. Allen, New Bedford, MA (US); Richard A. Allen, Concord, MA (US)

(73) Assignee: R.A. Allen Company, Inc., Vero Beach, FL (US)

( * ) Notice: Subject to any disclaimer, the term of this patent is extended or adjusted under 35 U.S.C. 154(b) by 455 days.

(21) Appl. No.: 10/833,874

(22) Filed: Apr. 28, 2004

(51) Int. Cl.
*B60R 9/06* (2006.01)

(52) U.S. Cl. .................. 224/503; 224/495; 224/519; 414/462

(58) Field of Classification Search ............... 224/503, 224/505, 508, 509, 518, 519, 495, 521, 924; 414/462
See application file for complete search history.

(56) References Cited

U.S. PATENT DOCUMENTS

| | | | | |
|---|---|---|---|---|
| 5,094,373 A | * | 3/1992 | Lovci ..................... | 224/519 |
| 5,190,195 A | * | 3/1993 | Fullhart et al. .......... | 224/519 |
| 5,445,488 A | * | 8/1995 | Saucier et al. ........... | 414/546 |
| 5,664,717 A | * | 9/1997 | Joder ..................... | 224/509 |
| 5,845,832 A | * | 12/1998 | Eichmann ............... | 224/509 |
| 5,884,826 A | * | 3/1999 | Shaver ................... | 224/509 |
| 5,996,870 A | * | 12/1999 | Shaver ................... | 224/509 |
| 6,443,345 B1 | * | 9/2002 | Bloemer et al. ......... | 224/519 |
| 6,561,396 B2 | * | 5/2003 | Ketterhagen ............ | 248/503 |

* cited by examiner

*Primary Examiner*—Nathan J. Newhouse
*Assistant Examiner*—Margaret Olson
(74) *Attorney, Agent, or Firm*—Herbert L. Bello

(57) ABSTRACT

A swing-away hitch mounted equipment carrier that is movable between collapsed and extended positions has a rectangular insert that is sized and shaped to be received in a trailer hitch receiver affixed to a vehicle. A fixed arm is attached to the insert. A first swing arm is pivotally connected to the fixed arm and a second swing arm is pivotally connected to the first swing arm. A vertical member having an equipment carrier affixed on an upper end is pivotally connected at a lower end to the second swing arm. The vertical member is constrained for rotational movement about its longitudinal axis, the equipment carrier rotating with the vertical member. A first control member is provided for controlling the pivoting movement of the first and second swing arms as the swing-away hitch mounted equipment carrier is moved between the collapsed and extended positions. A second control member is provided for controlling the rotational movement of the vertical member and the equipment carrier as the swing-away hitch mounted equipment carrier is moved between the collapsed and extended positions.

24 Claims, 5 Drawing Sheets

SWING-AWAY HITCH MOUNTED EQUIPMENT CARRIER

BACKGROUND OF THE INVENTION

1. Field of Invention

The present invention relates to hitch mounted equipment carriers that are configured to be attached to motor vehicles, and, more particularly, the invention is directed toward a swing-away hitch mounted equipment carrier with a pair of pivotally mounted swing arms, a vertical member rotatably connected to one of the swing arms and an equipment carrier mounted on the vertical member. Control members are provided for controlling the pivoting movement of the swing arms and the rotational movement of the equipment carrier as the hitch mounted equipment carrier is moved from a closed position to an opened position.

2. Description of the Prior Art

A variety of hitch mounted equipment carriers that are configured to be mounted to motor vehicles by means of trailer hitch receivers are available in the prior art. Examples of hitch mounted equipment carriers that are attachable to trailer hitch receivers are shown in U.S. Pat. Nos. 5,664,717; 5,845,832; 5,454,496; 6,123,498; 6,386,410 and 6,644,525.

Typically, pivoting hitch mounted equipment carriers have a rectangular base tube that is received in a trailer hitch receiver which is attached to a passenger vehicle. One end of a fixed arm is attached to the base tube and one end of a swing arm is pivotally connected to a free end of the fixed arm. A vertical upright member is attached to a free end of the swing arm. The vertical upright member is fixed against rotational movement relative to the swing arm. An equipment carrier, for example, a bicycle carrier, is mounted on the top of the vertical upright member. The bicycle carrier, which is configured to carry one or more bicycles, is fixed against rotational movement relative to the vertical upright member. Therefore, there was no way to rotate the bicycles relative to the swing arm. These hitch mounted equipment carriers have a relatively long swing arm in order to provide adequate clearance so that the bicycles mounted thereon do not interfere with the opening of the vehicle's rear door when the hitch mounted equipment carrier is opened. Accordingly, pivoting hitch mounted equipment carriers of this type have been met with varying degrees of success because they are cumbersome to use.

The vertical upright member of the pivoting hitch mounted equipment carriers shown in U.S. Pat. No. 5,664,717 is rotatably mounted to the swing arm and the carrying member is fixed to the vertical upright member. In U.S. Pat. No. 6,123,498, the vertical upright member is fixed to the swing arm and the carrying member is rotatably mounted to the vertical upright member. In each of these pivoting hitch mounted equipment carriers, the carrying member is free to rotate relative to the swing arm. Accordingly, a user can manually rotate the bicycles through an arc of ninety degrees relative to the back of the vehicle as the user moves the hitch mounted equipment carrier from its closed position to its opened position. Pivoting hitch mounted equipment carriers of this type have been met with varying degrees of success because there is nothing to control the movement of the bicycles through this ninety-degree arc as the hitch mounted equipment carrier is being opened, and the bicycles can swing into the user's vehicle.

Other prior art hitch mountable equipment carriers suffer from the limitation that it is difficult to securely fasten the bicycles to the hitch mounted equipment carrier because of the unwanted movement of the carrying member as the bicycles are placed and secured thereon.

A further disadvantage of prior art hitch mounted equipment carriers is that the center of gravity is not centered at the hitch receiver when the carriers are being installed on vehicles. These carriers have long metal arms that extend to one side, the arms being approximately half the width of the vehicle or greater. Prior art hitch mounted equipment carriers are heavy and weigh about fifty to sixty pounds. It is to be noted that most of this weight is concentrated in the long metal arms. Prior art hitch mounted equipment carriers with a displaced center of gravity and weight of approximately fifty to sixty pounds are cumbersome and difficult to install on vehicles.

A need has arisen for an improved, pivoting hitch mounted equipment carrier that does not suffer from aforementioned limitations and disadvantages.

SUMMARY OF THE INVENTION

An object of the present invention is to overcome the aforementioned limitations and disadvantages of prior art pivoting hitch mounted equipment carriers.

Another object of the present invention is to provide a swing-away hitch mounted equipment carrier that is movable between a closed or collapsed position and an opened or extended position while maintaining control of the position of items carried on the hitch mounted equipment carrier.

A further object of the invention is to provide a swing-away hitch mounted equipment carrier having control members that rotate the equipment carrier carried on the hitch mounted equipment carrier as the hitch mounted equipment carrier is moved between the collapsed and extended positions.

Yet another object of the invention is to provide a swing-away hitch mounted equipment carrier in which the center of gravity of the hitch mounted equipment carrier is at or near a hitch receiver to which the hitch mounted equipment carrier is mounted so that the weight of the hitch mounted equipment carrier is centered around the receiver hitch. Therefore, unlike prior art hitch mounted equipment carriers that weighed about fifty to sixty pounds and have a metal arm which extends to one side, the hitch mounted equipment carrier of the present invention is much easier to install.

A collapsible and extendable swing-away hitch mounted equipment carrier embodying the present invention for carrying equipment at the rear of a vehicle has a rectangular insert that is sized and shaped to be received in a hitch receiver affixed to the vehicle. A fixed arm is attached to the insert. A first swing arm is pivotally connected to the fixed arm. A second swing arm is pivotally connected to the first swing arm by means of a hinge bracket having an extending finger. The fixed arm and the swing arms are sized so that the center of gravity of the hitch mounted equipment carrier is at or near the center of the hitch receiver.

A vertical member having an equipment carrier affixed on an upper end is connected at a lower end to the second swing arm by means of a second hinge bracket. The vertical member is constrained for rotational movement about its longitudinal axis, the equipment carrier rotating with the vertical member. Pivotally mounted first and second control members are provided for controlling the pivoting movement of the first and second swing arms, and the rotational movement of the vertical member and the equipment carrier when the swing-away hitch mounted equipment carrier is moved between the collapsed and extended positions.

In the collapsed position, the first swing arm is in juxtaposition with the fixed arm and the second swing arm is in juxtaposition with the first swing arm. In the preferred embodiment, as the hitch mounted equipment carrier is moved from the collapsed position to the extended position, the first and second swing arms are pivotally moved in a counterclockwise direction and the equipment carrier rotates counterclockwise. In the fully extended position, the equipment carrier has moved through an arc of approximately one hundred and eighty degrees and has rotated approximately ninety degrees toward the side of the vehicle.

Other general and specific objects, features and advantages of the invention will in part be obvious and will in part appear hereinafter.

BRIEF DESCRIPTION OF THE DRAWINGS

An understanding of the nature and objects of the present invention will become more readily apparent upon consideration of the following detailed description taken in connection with the accompanying drawings, wherein.

DETAILED DESCRIPTION OF THE INVENTION

Figure 1:
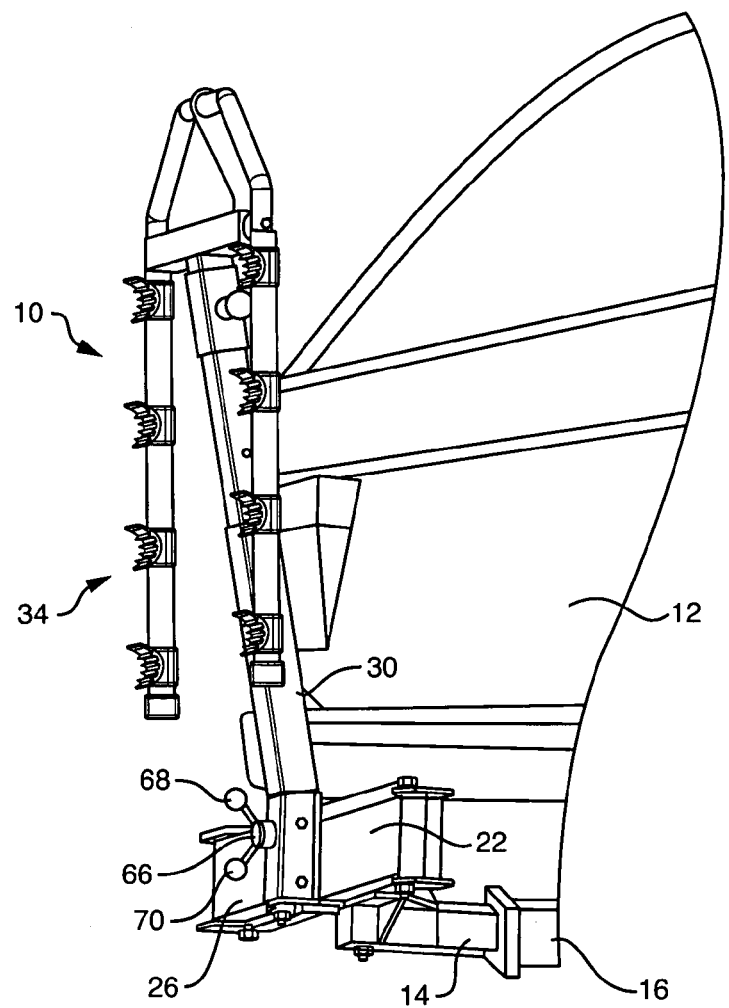
FIG. 1 is a perspective view of a swing-away hitch mounted equipment carrier embodying the invention mounted to a vehicle, the rack being in a closed position with its equipment carrier in a collapsed position.

Referring now to the drawings, particularly FIG. 1, there is shown a swing-away hitch mounted equipment carrier 10 embodying the invention that is configured to be detachably mounted to a vehicle 12. Swing-away hitch mounted equipment carrier 10 includes a generally horizontal insert 14 that is sized and shaped to be snugly received in a trailer hitch receiver 16 that is secured to the vehicle 12. As hereinafter described, hitch mounted equipment carrier 10 is movable between a closed or collapsed position shown in FIGS. 1, 2, and 5; a midway position in FIG. 3; and an opened or extended position shown in FIG. 4.

Figure 3:
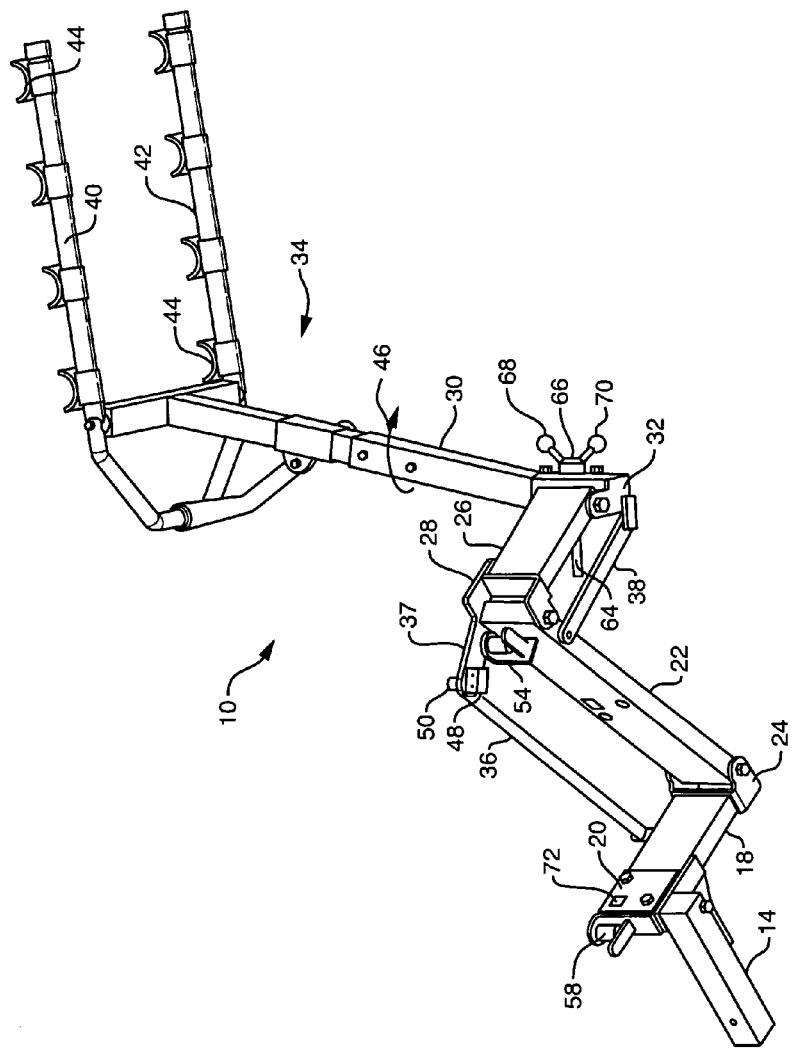
FIG. 3 is a perspective view of the swing-away carrier of FIG. 2 in a position that is midway between the closed position and an opened position, the equipment carrier being in an extended position.

As best shown in FIG. 3, hitch mounted equipment carrier 10 includes a fixed arm 18 that is attached to insert 14 by means of a bracket 20. One end of a first swing arm 22 is pivotally mounted to a free end of the fixed arm 18 by means of a first hinge bracket 24. A second swing arm 26 is pivotally mounted to a free end of the first swing arm 22 by means of a second hinge bracket 28. A lower end of a vertical member 30 is rotatably mounted to a free end of the second swing arm 26 by means of a third hinge bracket 32. An equipment carrier 34 is mounted to an upper end of the vertical member 30.

Opposite ends of a first control member 36 are pivotally connected to the fixed arm 18 and an extending finger 37 of the second hinge bracket 28. Movement of the swing arms 22 and 26 relative to the fixed arm 18 is governed by the first control member 36. The vertical member 30 is mounted to the third hinge bracket 32, the third hinge bracket being rotatably connected to a free end of the second swing arm 26. Opposite ends of a second control member 38 are pivotally connected to the first swing arm 22 and the third hinge bracket 32. Rotational movement of the vertical member 30 is governed by the second control member 38. The equipment carrier 34, for example, the collapsible carrier described in U.S. Pat. No. 6,644,525, incorporated herein by reference, is shown in its collapsed or storage position in FIGS. 1 and 5, and in its opened or operational position in FIGS. 2, 3 and 4. The fixed arm 18 and the swing arms 22,26 are sized so that the center of gravity of the hitch mounted equipment carrier 10 is at or near the center of the hitch receiver 16 (FIG. 1). In the illustrated embodiment, by way of example, the length of fixed arm 18 is approximately fifteen inches, the length of first swing arm 22 is approximately twenty-two inches and the length of third swing arm 26 is approximately nine inches.

The equipment carrier 34, for example, a bicycle carrier, includes a pair of carrying arms 40 and 42, each carrying arm is provided with holders or saddles 44. The carrying arms 40,42 are configured to carry one or more bicycles (not shown), the bicycles being secured to the carrying arms by means of the holders 44. In the illustrated embodiment, the equipment carrier 34 is secured to the top of the vertical member 30 and fixed against rotational movement relative to the vertical member. Accordingly, the carrying arms 40,42 and the bicycles mounted thereon rotate with the rotational movement of the vertical member 30. In an alternate embodiment, the second control member 38 is operatively connected to the equipment carrier 34 and controls the rotational movement of the equipment carrier as the hitch mounted equipment carrier 10 is moved between its closed and extended positions.

Figure 4:
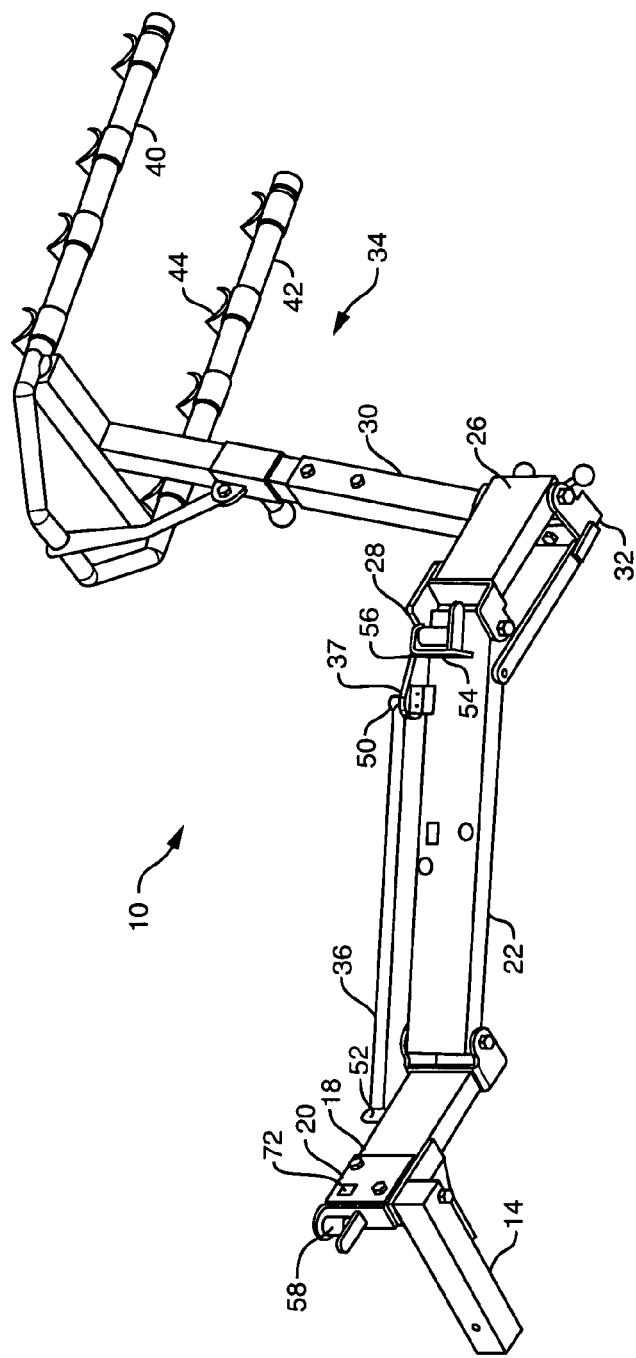
FIG. 4 is a perspective view of the swing-away carrier of FIG. 2 in the opened position, the equipment carrier being in an extended position.

A block 48 is mounted to the extending finger 37 of the second hinge bracket 28 opposite a pin member 50 by which the first control member 36 is pivotally mounted to the second hinge bracket. The other end of the first control member 36 is pivotally connected to the fixed arm 18 by means of a pin member 52. Block 48, which is composed of a resilient material, for example, rubber or a plastic, acts as a shock absorber and stop for limiting movement of swing-away hitch mounted equipment carrier 10 as it is moved to the opened position. As best shown in FIG. 4, pop-up locking pin 54, which is mounted to the first swing arm 22, engages a latch 56 that is provided in the second hinge bracket 28 for holding the swing-away hitch mounted equipment carrier 10 in its opened position.

As previously noted, the swing-away hitch mounted equipment carrier 10 is movable between a closed or collapsed position and an opened or extended position. As the swing-away hitch mounted equipment carrier 10 is moved from its closed position to its opened position, the first swing arm 22 pivots in the first hinge bracket 24. Since the first control member 36 is pivotally connected to the fixed arm 18 and the second hinge bracket 28, the pivoting movement of the first swing arm 22 causes the second hinge bracket 28 to pivot. Pivoting movement of the second hinge bracket 28 causes the second swing arm 26 to pivot, the second swing arm being fixed to the second hinge bracket. Since the second control member 38 is pivotally connected to the first swing arm 22 and the third hinge bracket 32, pivoting movement of the second swing arm 26 causes pivoting movement of the third hinge bracket 32. Pivoting movement of the third hinge bracket 32 causes the vertical member 30 to rotate, the vertical member being fixed to the third hinge bracket. Rotational movement of the vertical member 30 results in rotational movement of the equipment carrier 34 and the carrying arms 40,42. Accordingly, when the swing-away hitch mounted equipment carrier 10 is moved counterclockwise through an arc of approximately one hundred and eighty degrees from its closed position shown in FIG. 2 to its opened position shown in FIG. 4, the vertical member 30 and the carrying arms 40,42 have traveled counterclockwise and have rotated counterclockwise approximately ninety degrees, the counterclockwise movement of the vertical member 30 being shown by the arrow 46 in FIG. 3. The carrying arms 40,42 have traveled from an initial rearwardly pointing position at the back of the vehicle 12 to a final resting position at one side of the back of the vehicle. In the final resting position, the bicycles carried on carrying arms 40,42 are positioned approximately parallel to the side of the vehicle 12.

Figure 2:
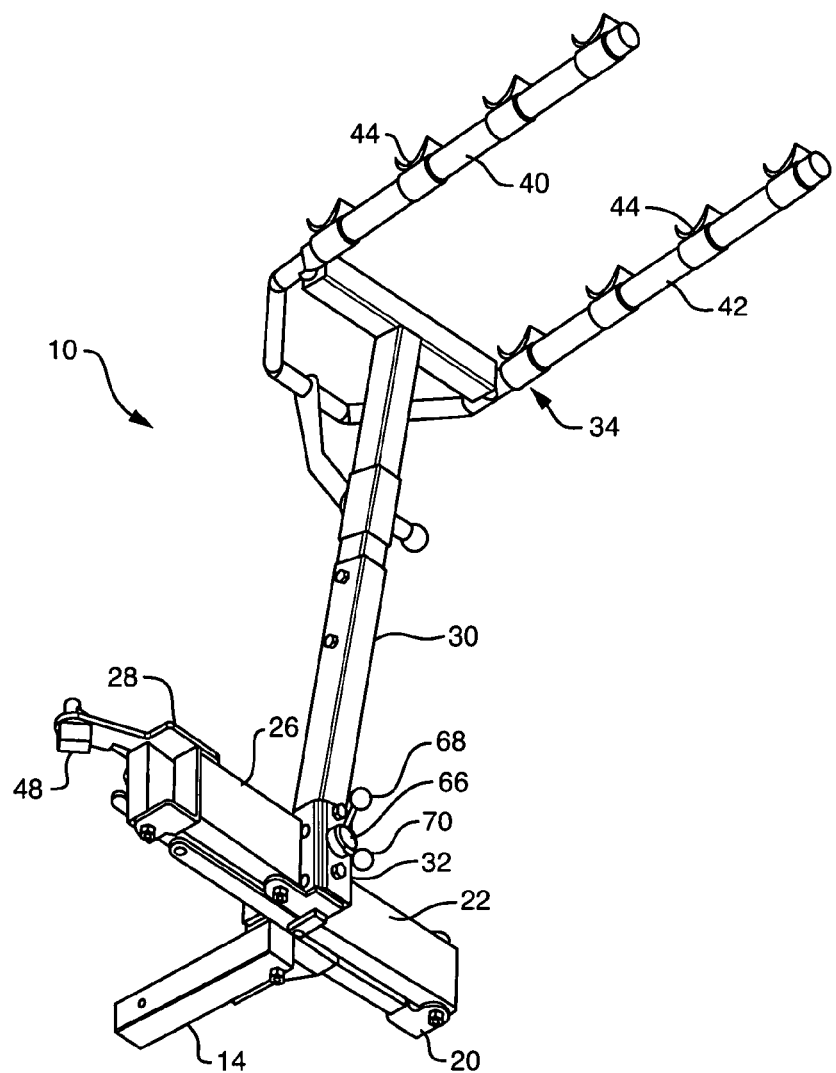
FIG. 2 is a perspective view of the swing-away hitch mounted equipment carrier in the closed position with the equipment carrier in an extended position.
Figure 5:
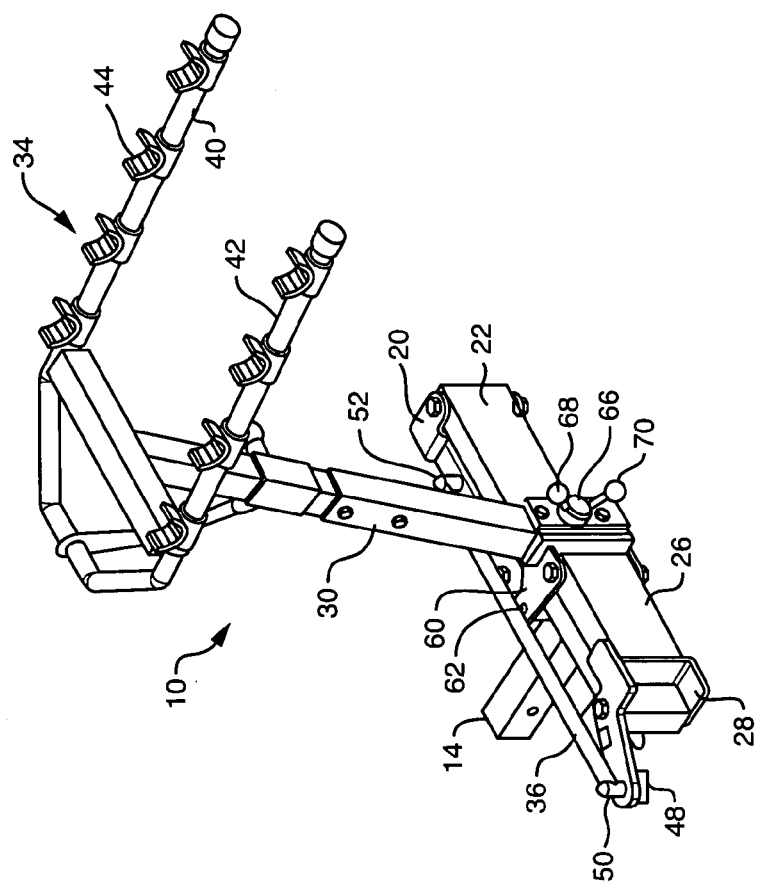
FIG. 5 is a perspective view of the swing-away hitch mounted equipment carrier locked in its closed position.

In a reverse manner, when the swing-away hitch mounted equipment carrier 10 is moved clockwise from its opened position shown in FIG. 4 to its closed position shown in FIGS. 2 and 5, the carrying arms 40,42 rotate approximately ninety degrees clockwise from its position at the side of the vehicle 12 to its rearwardly pointing position at the rear of the vehicle. A pop-up locking pin 58 for holding the swing-away hitch mounted equipment carrier 10 in its closed position is mounted to the bracket 20. A latching bracket 60 having a latch 62 is mounted to the second swing arm 26 adjacent the third hinge bracket 32. When the swing-away hitch mounted equipment carrier 10 is moved to its closed position, the pop-up pin 58 engages the latch 62 for holding the swing-away hitch mounted equipment carrier in the collapsed or closed position. A locking bolt 64 with a head 66 having handles 68 and 70 is mounted to the third hinge bracket 32, the bolt passing through the vertical member 30 and extending inwardly toward the insert 14. When the swing-away hitch mounted equipment carrier 10 is in its closed position, the extending portion of locking bolt 64 is in alignment with a locking nut 72 in the bracket 20. Handles 66 and 68 define a purchase for turning and tightening the locking bolt 64 in the locking nut 72. When the locking bolt 64 is tightly secured in locking nut 72, swing-away hitch mounted equipment carrier 10 is securely locked in the closed position.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A collapsible swing-away hitch mounted equipment carrier that is configured to be detachably mounted to a vehicle, said swing-away hitch mounted equipment carrier movable between a collapsed position and an extended position, said swing-away hitch mounted equipment carrier comprising:
    (a) securing means for securing the swing-away hitch mounted equipment carrier to the vehicle;
    (b) a fixed arm attached to said securing means;
    (c) a first swing arm;
    (d) a first hinge means attached to said fixed arm and one end of said first swing arm, said first hinge means providing relative pivotal movement of said fixed arm and said first swing arm;
    (e) a second swing arm;
    (f) a second hinge means attached to a free end of said first swing arm and one end of said second swing arm, said second hinge means providing relative pivotal movement of said first swing arm and said second swing arm;
    (g) a vertical member;
    (h) a third hinge means connected to a free end of said second swing arm said vertical member, said third hinge means providing rotational movement of said vertical member relative to said second swing arm;
    (i) an equipment carrier attached to said vertical member;
    (j) a first control member means operatively connected to said fixed arm and said second hinge means, said first control member means controlling the pivotal movement of said first and second swing arms relative to said fixed arm; and
    (k) a second control member means operatively connected to said first swing arm and said third hinge means, said second control member means controlling movement of said equipment carrier relative to said second swing arm.

2. A collapsible swing-away hitch mounted equipment carrier that is configured to be detachably mounted to a trailer hitch receiver that is attached to a vehicle, said swing-away hitch mounted equipment carrier movable between a collapsed position and an extended position, said swing-away hitch mounted equipment carrier comprising:
    (a) an insert that is sized and shaped to be received in the trailer hitch receiver;
    (b) a fixed arm, one end of said fixed arm is attached to said insert;
    (c) a first hinge means attached to a free end of said fixed arm;
    (d) a first swing arm, one end of said first swing arm is connected to said first hinge means;
    (e) a second hinge means attached to a free end of said first swing arm;
    (f) a second swing arm, one end of said second swing arm is connected to said second hinge means;
    (g) a third hinge means connected to a free end of said second swing arm;
    (h) an equipment carrier operatively connected to said third hinge means;
    (i) a first control member means having first and second ends, a first end of said first control member means is pivotally connected to said fixed arm, a second end of said first control member means pivotally connected to said second hinge means, said first control member means governing movement of said first and second swing arms relative to said fixed arm; and
    (j) a second control member means having first and second ends, a first end of said second control member means pivotally connected to said first swing arm, a second end of said second control member means pivotally connected to said third hinge means, said second control member means governing movement of said equipment carrier relative to said second swing arm.

3. The swing-away hitch mounted equipment carrier as claimed in claim 2 wherein the lengths of said fixed arm, said first swing arm and said second swing arm are such that a center of gravity of said swing-away hitch mounted equipment carrier is at or near the center of the trailer hitch receiver when said hitch mounted equipment carrier is in its closed position.

4. The swing-away hitch mounted equipment carrier as claimed in claim 3 including:
    (a) locking means operatively connected to at least one of said second swing arm and said third hinge means and said vertical member; and (b) latching means associated with said fixed arm, said locking means and said latching means cooperating to lock said swing-away hitch mounted equipment carrier in said collapsed position.

5. The swing-away hitch mounted equipment carrier as claimed in claim 3 wherein the length of said first swing arm is longer than the length of either said fixed arm or said second swing arm.

6. A collapsible swing-away hitch mounted equipment carrier that is configured to be detachably mounted to a vehicle, said swing-away hitch mounted equipment carrier movable between a collapsed position and an extended position, said swing-away hitch mounted equipment carrier comprising:
   (a) securing means for securing said swing-away hitch mounted equipment carrier to the vehicle;
   (b) a fixed arm having first and second ends, said securing means securing said first end of said fixed arm to the vehicle;
   (c) a first swing arm having first and second ends, said first end of said first swing arm pivotally connected to said second end of said fixed arm, said first swing arm in juxtaposition with said fixed arm when said swing-away hitch mounted equipment carrier is in the collapsed position;
   (d) a second swing arm having first and second ends;
   (e) a first hinge means with an extending finger at said first end of said second swing arm, said second end of said first swing arm connected to said first hinge means, said second swing arm in juxtaposition with said first swing arm when said swing-away hitch mounted equipment carrier is in the collapsed position;
   (f) a vertical member having upper and lower ends;
   (g) a second hinge means at said lower end of said vertical member, said second end of said second swing arm connected to said second hinge means, said vertical member rotating when said swing-away hitch mounted equipment carrier is moved between the collapsed and extended positions;
   (h) an equipment carrier attached to said vertical member;
   (i) a first control member means operatively connected to said fixed arm and said extending finger of first hinge means, said first control member means controlling the pivotal movement of said second swing arm; and
   (j) a second control member means operatively connected to said first swing arm and said second hinge means, said second control member means controlling rotational movement of said vertical member and said equipment carrier when said swing-away hitch mounted equipment carrier is moved between the collapsed and extended positions.

7. The swing-away hitch mounted equipment carrier as claimed in claim 6 wherein said equipment carrier is movable between a collapsed storage position and an extended carrying position.

8. The swing-away hitch mounted equipment carrier as claimed in claim 6 wherein said equipment carrier is a bicycle carrier having a pair of carrying arms, said bicycle carrier mounted at said upper end of said vertical member.

9. The swing-away hitch mounted equipment carrier as claimed in claim 6 including locking means for locking said swing-away hitch mounted equipment carrier in said collapsed storage position.

10. The swing-away hitch mounted equipment carrier as claimed in claim 6 including locking means for holding said swing-away hitch mounted equipment carrier in said extended position.

11. The swing-away hitch mounted equipment carrier as claimed in claim 6 including:
   (a) a first locking means operatively connected to said fixed arm; and
   (b) a first latching means operatively connected to said second swing arm, said first locking means and said first latching means cooperating to hold said swing-away hitch mounted equipment carrier in said collapsed position.

12. The swing-away hitch mounted equipment carrier as claimed in claim 11 including:
   (a) a second locking means operatively connected to said first swing arm; and
   (b) a second latching means operatively connected to said second swing arm, said second locking means and said second latching means cooperating to hold said swing-away hitch mounted equipment carrier in said extended position.

13. A collapsible swing-away hitch mounted equipment carrier that is configured to be detachably mounted to a trailer hitch receiver that is attached to a vehicle, said swing-away hitch mounted equipment carrier movable between a collapsed position and an extended position, said swing-away hitch mounted equipment carrier comprising:
   (a) securing means for securing said swing-away hitch mounted equipment carrier to the trailer hitch receiver;
   (b) a fixed arm having first and second ends, said securing means securing said first end of said fixed arm to the vehicle;
   (c) a first swing arm having first and second ends, said first end of said first swing arm pivotally connected to said second end of said fixed arm, said first swing arm in juxtaposition with said fixed arm when said swing-away hitch mounted equipment carrier is in the collapsed position;
   (d) a second swing arm having first and second ends;
   (e) a first hinge means at said first end of said second swing arm, said second end of said first swing arm connected to said first hinge means, said second swing arm in juxtaposition with said first swing arm when said swing-away hitch mounted equipment carrier is the collapsed position;
   (f) a vertical member operatively connected to said second end of said second swing arm, said vertical member connected for rotational movement relative to said second swing arm;
   (g) an equipment carrier attached to said vertical member;
   (h) a first control means operatively connected to said fixed arm and said first hinge means, said first control means controlling the pivotal movement of said second swing arm; and
   (i) a second control means operatively connected to said first swing arm and one of said vertical member and said equipment carrier, said second control means controlling rotational movement of said equipment carrier when said swing-away hitch mounted equipment carrier is moved between the collapsed and extended positions.

14. The swing-away hitch mounted equipment carrier as claimed in claim 13 including a second hinge means, said second end of said second swing arm pivotally connected to said second hinge means, said vertical member rotating when said swing-away hitch mounted equipment carrier is moved between the collapsed and extended positions.

15. The swing-away hitch mounted equipment carrier as claimed in claim 13 wherein said equipment carrier is a bicycle carrier having a pair of carrying arms.

16. The swing-away hitch mounted equipment carrier as claimed in claim 14 including first holding means operatively connected to said first swing arm and said second hinge means for holding said swing-away hitch mounted equipment carrier in said extended position.

17. The swing-away hitch mounted equipment carrier as claimed in claim 16 including a latching means and a second holding means, said latching means operatively connected to one of said first swing arm and said second hitch means, said second holding means operatively connected to the other of said first swing arm and said second hitch means, said second holding means holding said swing-away hitch mounted equipment carrier in said extended position.

18. The swing-away hitch mounted equipment carrier as claimed in claim 13 including:
   (a) a first locking means operatively connected to said fixed arm; and
   (b) a first latching means operatively connected to said second swing arm, said first locking means and said first latching means cooperating to lock said swing-away hitch mounted equipment carrier in said collapsed position.

19. The swing-away hitch mounted equipment carrier as claimed in claim 13 wherein the lengths of said fixed arm, said first swing arm and said second swing arm are such that a center of gravity of said swing-away hitch mounted equipment carrier is at or near the center of the trailer hitch receiver when said hitch mounted equipment carrier is in its closed position.

20. The swing-away hitch mounted equipment carrier as claimed in claim 19 wherein the length of said first swing arm is greater than the length of either said fixed arm or said second swing arm.

21. A swing-away hitch mounted equipment carrier that is configured to be detachably mounted to a trailer hitch receiver that is attached to a vehicle, said swing-away hitch mounted equipment carrier movable between a collapsed or closed position and an extended or opened position, said swing-away hitch mounted equipment carrier comprising:
   (a) securing means for securing said swing-away hitch mounted equipment carrier to the trailer hitch receiver;
   (b) a fixed arm having first and second ends, said securing means securing said first end of said fixed arm to the vehicle;
   (c) a first swing arm having first and second ends, said first end of said first swing arm pivotally connected to said second end of said fixed arm, said first swing arm in juxtaposition with said fixed arm when said swing-away hitch mounted equipment carrier is in the collapsed position;
   (d) a second swing arm having first and second ends, the lengths of said fixed arm, said first swing arm and said second swing arm are such that a center of gravity of said swing-away hitch mounted equipment carrier is at or near the center of the trailer hitch receiver when said hitch mounted equipment carrier is in its collapsed or closed position;
   (e) a first hinge means at said first end of said second swing arm, said second end of said first swing arm connected to said first hinge means, said second swing arm in juxtaposition with said first swing arm when said swing-away hitch mounted equipment carrier is the collapsed position;
   (f) a second hinge means operatively connected to said second end of said second swing arm, said second hinge means constrained for pivotal movement relative to said second swing arm;
   (g) an equipment carrier operatively connected to said second hinge means, said equipment carrier rotating with pivotal movement of said second hinge means; and
   (h) a control means operatively connected to said fixed arm and said first hinge means for controlling the pivotal movement of said second swing arm as said swing-away hitch mounted equipment carrier is moved between the collapsed or closed position and the extended or opened position.

22. The swing-away hitch mounted equipment carrier as claimed in claim 21 wherein the length of said first swing arm is longer than the length of said fixed arm and the length of said fixed arm is longer than the length of said second swing arm.

23. A swing-away hitch mounted equipment carrier that is configured to be detachably mounted to a trailer hitch receiver that is attached to a vehicle, said swing-away hitch mounted equipment carrier movable between a collapsed or closed position and an extended or opened position, said swing-away hitch mounted equipment carrier comprising:
   (a) securing means for securing said swing-away hitch mounted equipment carrier to the trailer hitch receiver;
   (b) a fixed arm having first and second ends, said securing means securing said first end of said fixed arm to the vehicle;
   (c) a first swing arm having first and second ends, said first end of said first swing arm pivotally connected to said second end of said fixed arm, said first swing arm in juxtaposition with said fixed arm when said swing-away hitch mounted equipment carrier is in the collapsed position;
   (d) a second swing arm having first and second ends, the lengths of said fixed arm, said first swing arm and said second swing arm are such that a center of gravity of said swing-away hitch mounted equipment carrier is at or near the center of the trailer hitch receiver when said hitch mounted equipment carrier is in its collapsed or closed position;
   (e) a first hinge means at said first end of said second swing arm, said second end of said first swing arm connected to said first hinge means, said second swing arm in juxtaposition with said first swing arm when said swing-away hitch mounted equipment carrier is the collapsed position;
   (f) a second hinge means operatively connected to said second end of said second swing arm, said second hinge means constrained for pivotal movement relative to said second swing arm;
   (g) an equipment carrier operatively connected to said second hinge means, said equipment carrier rotating with pivotal movement of said second hinge means;
   (h) a control means operatively connected to said first swing arm and said second hinge means for controlling the rotational movement of said equipment carrier as said swing-away hitch mounted equipment carrier is moved between the collapsed or closed position and the extended or opened position.

24. The swing-away hitch mounted equipment carrier as claimed in claim 23 wherein the length of said first swing arm is longer than the length of either said fixed arm or said second swing arm.

* * * * *